United States Patent [19]

Kaieda et al.

[11] 4,232,259

[45] Nov. 4, 1980

[54] SERVO-SYSTEM

[75] Inventors: Nobuo Kaieda; Yoshihiro Okano, both of Musashino, Japan

[73] Assignee: Yokogawa Electric Works, Ltd., Tokyo, Japan

[21] Appl. No.: 864,817

[22] Filed: Dec. 27, 1977

[30] Foreign Application Priority Data

Dec. 28, 1976 [JP] Japan .............................. 51-160537
Dec. 28, 1976 [JP] Japan .............................. 51-160538

[51] Int. Cl.$^3$ .............................................. G05B 5/01
[52] U.S. Cl. .................................... 318/615; 318/621; 318/641; 318/677; 318/678; 318/679; 318/684
[58] Field of Search ............... 318/615, 621, 677, 678, 318/679, 684, 641, 616

[56] References Cited

U.S. PATENT DOCUMENTS

| 3,852,650 | 12/1974 | Masuzawa et al. ................. 318/615 |
| 3,866,103 | 2/1975 | Maezawa et al. .................... 318/678 |
| 4,055,788 | 10/1977 | Greeley ................................ 318/677 |
| 4,161,678 | 7/1979 | Kaieda et al. ....................... 318/677 |

Primary Examiner—J. V. Truhe
Assistant Examiner—Eugene S. Indyk
Attorney, Agent, or Firm—Parmelee, Johnson, Bollinger & Bramblett

[57] ABSTRACT

A servo-system includes a high-gain direct-coupled direct current (dc) differential amplifier to which a dc input signal is fed. An adder adds the dc amplifier output to a comparison voltage, and the adder output is applied through a filter circuit to a second input of the differential dc amplifier. A servo-amplifier drives a servo-motor in accordance with the dc amplifier output. Means are provided for zero-balancing the dc amplifier output while varying the comparison voltage by the servo-motor.

15 Claims, 6 Drawing Figures

SERVO-SYSTEM

BACKGROUND OF THE INVENTION

The present invention relates to a servo-system for use in an automatic balancing instrument or the like.

In prior servo-systems, a direct-current (dc) signal representing the deviation between an input signal and a comparison value is amplified by an alternating current (ac) amplifier after conversion to an alternating current by means of a chopper, and an ac servo-motor is driven to displace the brush of a slide resistor in a comparison-value generator circuit so as to zero-balance the dc deviation signal. The chopper and the ac amplifier are ac coupled to each other through a coupling capacitor. The existence of such a coupling capacitor in a servo-loop causes a phase shift which leads to unstable operation of the servo-loop.

In one recent servo-system disclosed in U.S. Pat. No. 3,866,103, for example, a linear integrated circuit (IC) including a direct-coupled amplifier is employed. However, since the linear IC is used as a high-gain ac amplifier, it becomes necessary to provide a bias stabilizing circuit for applying negative feedback to the linear IC in a dc and low-frequency range, hence complicating the structure. Moreover, the bias stabilizing circuit causes delay in the signal phase which reduces the servo-system gain (motor torque and speed). This phenomenon is particularly regarded as a great disadvantage because it is more conspicuous as the linear IC gain becomes higher. Furthermore, an input variation range is wide in the servo-system of this type. For one automatic balancing instrument, for example, the input span varies in the order of $10^3$ times since the minimum span is 5 millivolts while the maximum span is 25 volts. For this reason, the voltage from a slide resistor is introduced as a comparison value through a voltage divider circuit for range adjustment, and the displacement of the slide resistor brush from 0 to 100 percent is made to correspond to the input span. But if the voltage division ratio of the divider circuit is changed for range adjustment, the loop gain of the servo-loop is also changed, and such a change is wide particularly in the automatic balancing instrument. It is desired that the loop gain in the servo-loop be constant despite nonlinearity of the loop and its vibratory transfer function. Accordingly, in the range adjustment performed heretofore, manual operation was necessary to adjust the servo-amplifier gain to avoid a change in the loop gain, and thus there exist some disadvantages including complicated adjustment and increase of the number of component parts to be changed for the range adjustment.

Such problems are solved in the servo-system of U.S. patent application Ser. No. 738,736 now U.S. Pat. No. 4,161,678 filed by the same inventors on Nov. 4, 1976. In that application an input signal and a comparison value are amplified by a dc amplifier employing a linear IC and are then converted to a rectangular-wave signal by a servo-amplifier consisting of a linear IC and a switch, so as to drive an ac servo-motor. As before, in this servo-system two or three stages of low-pass filters consisting of capacitors and resistors are cascade-connected to the input circuit through which the input signal is fed, so as to attenuate commercial-frequency noise superposed on the input signal. The time constant of each filter is selected to be great for the purpose of attaining a high noise attenuation ratio. The existence of any filter of a great time constant in the input circuit is disadvantageous since the input impedance is reduced in a high-frequency range and since the input circuit is restricted by the withstand voltage and leakage current of the filter capacitor. In the instance where the servo-system is formed into a multiplex type to switch the input signal sequentially by a selector switch, there occurs a state where the input is open during the switching action. In such a state the input resistance on the input-circuit side as viewed from the amplifier is widely changed resulting in charging of the filter capacitor to an abnormal voltage. This phenomenon is particularly conspicuous when a direct-coupled dc amplifier is employed because of the amplifier's bias current. And the charge voltage causes malfunctioning of the system since the charge voltage determined by the time constant of the filter is held even after switchover to the next input. In addition to the above, on many occasions where instruments such as controllers and alarms are connected in parallel with the servo-system, a charging current flowing transiently in the filter capacitor at the variation or switchover of the input signal is liable to bring about a disturbance in the parallel-connected instruments. In order to prevent such result, each instrument is generally equipped with an individual filter which further complicates the entire system.

In the servo-system of this type, a thermocouple or a resistance bulb is also used as an input signal source for the servo-system. Therefore, it would be remarkably convenient if such an input signal source could be formed with a minimum change of component parts.

Where a thermocouple is employed as an input signal source, it is desired that the thermocouple output be automatically compensated by an electric signal proportional to the temperature detected at the cold junction, since the thermocouple generates a thermoelectromotive force proportional to the temperature difference between the detecting end and the cold junction.

Where a resistance bulb is used as an input source, a resistance variation in the resistance bulb should be as linear as possible relative to the temperature at the detecting end despite its tendancy to become non-linear. Further, since an error occurs due to the influence of leadwire resistance in the resistance bulb, effective removal of such influence is desirable.

SUMMARY OF THE INVENTION

The principal object of the present invention is to provide a novel servo-system which solves the aforementioned problems resulting from the use of filters.

Another object of the present invention is to provide a servo-system with satisfactory damping characteristics where a high noise-attenuation ratio is achievable.

Another object of the invention resides in providing a servo-system capable of maintaining the loop gain of a servo-loop substantially constant regardless of range adjustment.

Another object of the invention resides in providing a servo-system where adjustments are facilitated in accordance with the type of input signal and its variation span.

Another object of the invention is to provide a servo-system capable of performing automatic compensation for the cold junction in a thermocouple.

Another object of the invention is to provide a servo-system capable of performing effective compensation for the nonlinearity of a resistance bulb.

And a further object of the invention is to provide a servo-system capable of achieving effective compensation for the influence of leadwire resistance in a resistance bulb.

DESCRIPTION OF THE PREFERRED EMBODIMENTS

Figure 1:
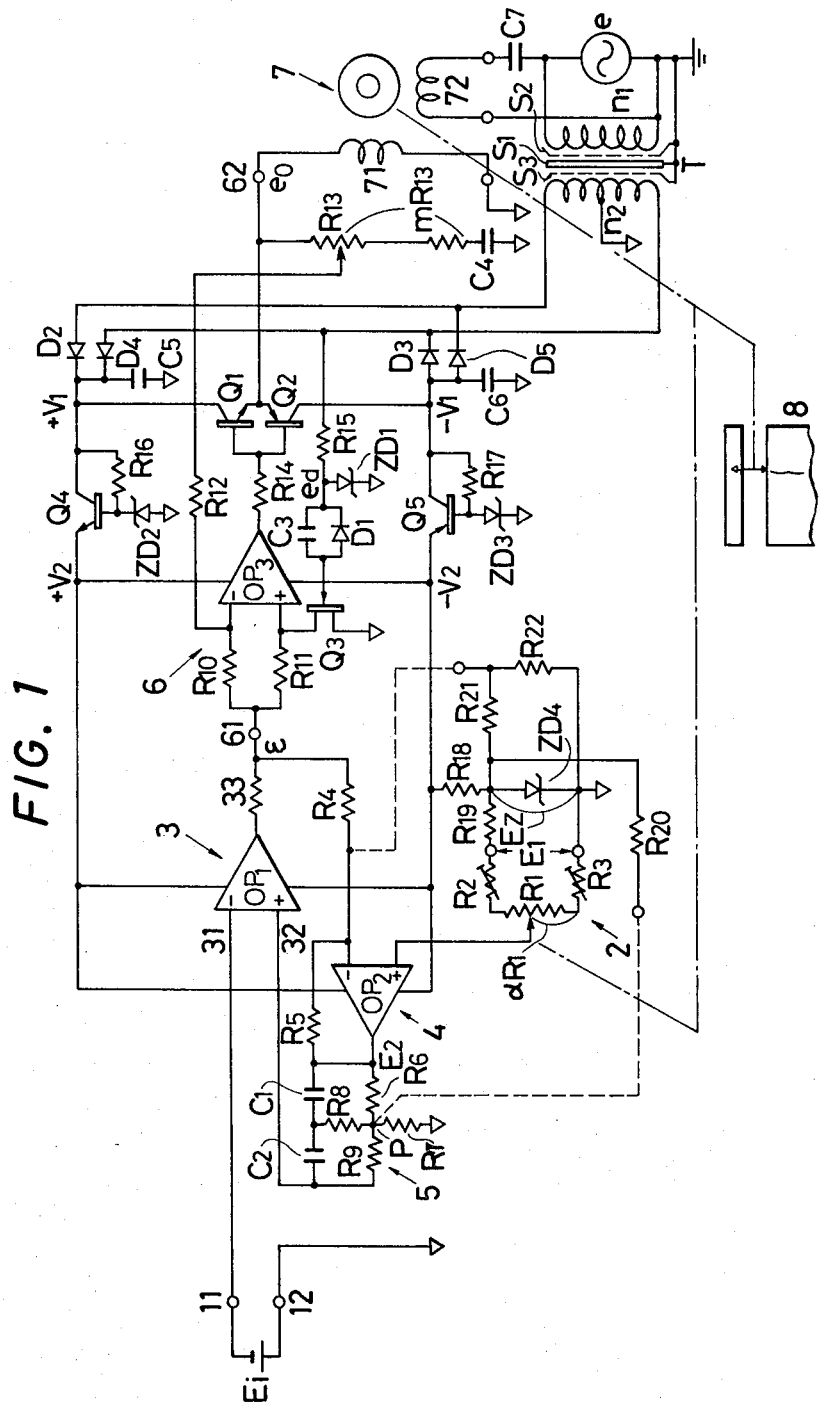
FIG. 1 is an electric circuit diagram of a servo-system embodying the present invention.

In FIG. 1 showing the circuit in an embodiment of the present invention, a dc input signal voltage Ei is applied across signal input terminals 11, 12. The terminal 12 is connected to a reference output. A potentiometer 2 for generating a comparison voltage Ef includes a series circuit consisting of a slide resistor R1, a span adjusting resistor R2 and a zero-adjusting resistor R3. A stabilized voltage E1 is applied across the series circuit. The signal input terminal 11 is connected to an inversion input terminal 31 of a high gain direct-coupled differential dc amplifier 3, which is a linear IC OP1.

The brush of slide resistor R1 of the potentiometer 2 is connected to the noninversion input terminal (+) of linear IC OP2 adder 4, and the output terminal 33 of dc amplifier 3 is connected to the inversion input terminal (−) of IC OP2 through a resistor R4. A resistor R5 is connected between the output terminal and the noninversion input terminal (−) of linear IC OP2. A high pass filter circuit 5 is connected between the adder 4 and the noninversion input terminal 32 of dc amplifier 3. The filter comprises two capacitors C1, C2 in series between the input and output thereof, two voltage dividing resistors R6, R7 for dividing the output voltage of the adder 4, a resistor R8 for coupling the junction of resistors R6 and R7 to the junction of capacitors C1 and C2, and a resistor R9 for connecting resistors R6 and R7 to the input of dc amplifier 3. The group of resistors R6, R7, R8, R9 of filter circuit 5 are composed of metallic films evaporated on one substrate with the said resistor R5 and resistors R20, R21, R22, R26, R27, R29, R30 (which will be described afterward) as a single resistance module. The resistors of this resistance module are formed into a pattern to obtain the required resistance range and accuracy, and the desired resistance values are attainable by trimming.

A servo-amplifier 6 comprises a linear IC OP3, complementary transistors Q1, Q2 coupled directly to OP3, and a switching field-effect transistor Q3. The input terminal 61 of servo-amplifier 6 is connected to the output terminal 33 of dc amplifier 3 and also to the inversion input terminal (−) and noninversion input terminal (+) of linear IC OP3 through resistors R10 and R11 respectively. The output terminal of linear IC OP3 is connected in common to the bases of transistors Q1 and Q2 through a resistor 14. The emitters of transistors Q1, Q2 are connected in common to the output terminal 62 of servo-amplifier 6, which is further connected to a reference point through a variable resistor R13 and a capacitor C4.

The brush of variable resistor R13 is connected to the inversion input terminal (−) of linear IC OP3 through a resistor R12 so as to apply negative feedback. This negative feedback serves to sufficiently reduce the output impedance of servo-amplifier 6. Positive and negative dc voltages $+V1$, $-V1$ are applied to the collectors of transistors Q1, Q2 respectively.

The drain of field-effect transistor Q3 is connected to the noninversion input terminal (+) of linear IC OP3, and its source is connected to the reference point. The field-effect transistor Q3 constitutes a switch turned on and off repeatedly by a drive signal $e_d$ which has the same frequency as an ac power supply e and is applied to the gate of Q3 through a parallel circuit consisting of a diode D1 and a capacitor C3. The drive signal $e_d$ may be applied through a resistor to the gate of Q3.

A control coil 71 of a two-phase ac servo-motor 7 is connected between the output terminal 62 of servo-amplifier 6 and the reference point. The exciting coil 72 of the servo-motor 7 is connected to the ac power supply e through a phase-shift capacitor C7. The rotating shaft of the ac servo-motor 7 is coupled to the brush of the slide resistor R1 and also to an indicating/recording mechanism 8 so as to drive the same.

A primary winding n1 of a power transformer T is connected to the ac power supply e, and the middle point of secondary winding n2 of the transformer T is connected to the reference point. The voltage induced in the secondary winding n2 is clipped by a zener diode ZD1 through a resistor R15 to produce a half-wave rectangular drive signal $d_d$, which is then applied to the gate of field-effect transistor Q3. The voltage induced in the secondary winding n2 is also full-wave rectified by diodes D2, D3 and D4, D5 respectively and is smoothed by capacitors C5, C6 to produce positive and negative dc voltages $+V1$, $-V1$, which are applied to the collectors of transistors Q1, Q2. Alternatively, the full-wave rectified voltage may be applied to transistors Q1, Q2 prior to smoothing by the capacitors C5, C6.

The positive and negative dc voltages $+V1$, $-V1$ are stabilized by zener diodes ZD2, ZD3, respectively, through resistors R16, R17 to produce positive and negative dc voltages $+V2$, $-V2$ by way of transistors Q4, Q5 and then are fed to the power terminals of linear ICs OP1–OP3. The negative dc voltage $-V2$ is further stabilized by a zener diode ZD4 through a resistor R18 and then is fed as dc voltage D1 through a resistor R19 to a series circuit including the slide resistor R1.

The power transformer T is equipped with a cross-contact preventive plate S1 and shields S2, S3 so as to prevent interference of noise from the ac power supply e to the secondary.

In the circuit embodying the invention as described above, since the gains of linear ICs OP1 and OP2 are sufficiently high, the output $\epsilon(s)$ of dc amplifier 3 in the S domain is represented by the following equation:

$$\epsilon(s) = \frac{R4}{R5} \left\{ \frac{1}{R(S)} Ei(S) - (1 + \frac{R5}{R4}) Ef \right\} \quad (1)$$

where R(S) is the transfer function of filter circuit 5. Thus, the dc amplifier 3 is so composed as not to cause any delay to the comparison voltage Ef while having excellent low-pass filter characteristics relative to the input signal Ei. Accordingly, against the noise superposed on the input signal voltage Ei, a large noise-suppression ratio is obtained by the use of the filter 5 having a small time constant, and a high input impedance is maintained even to relatively high frequencies without an input-impedance reduction resulting from the filter.

When the amplifier constituting a servo-system has a large delay factor as in this case, generally the servo-system is placed in an extremely unstable state, but due to the structure where no delay is caused in the comparison voltage Ef as mentioned above, the stability of the servo-system is not impaired at all. In the case of multiplex systems, even when the input is open during the switching action, the voltage of filter 5 remains unchanged as in the zero-balanced state thereby avoiding malfunction. Moreover, the charge current flowing transiently in the filter capacitor at the variation or switchover of the input signal can be minimized while shortening the time constant, so that with respect to the influence on the instruments connected in parallel with the servo-system, it becomes possible to obtain satisfactory characteristics equivalent or superior to those in the instance where filters are provided individually on the input side of the instruments. Furthermore, owing to the low-pass filter characteristics of dc amplifier 3, such characteristics can be widely changed according to selection of the filter constant, thereby rendering excellent damping characteristics obtainable through proper selection of the damping constant in accordance with response of the servo-system.

Figure 3:
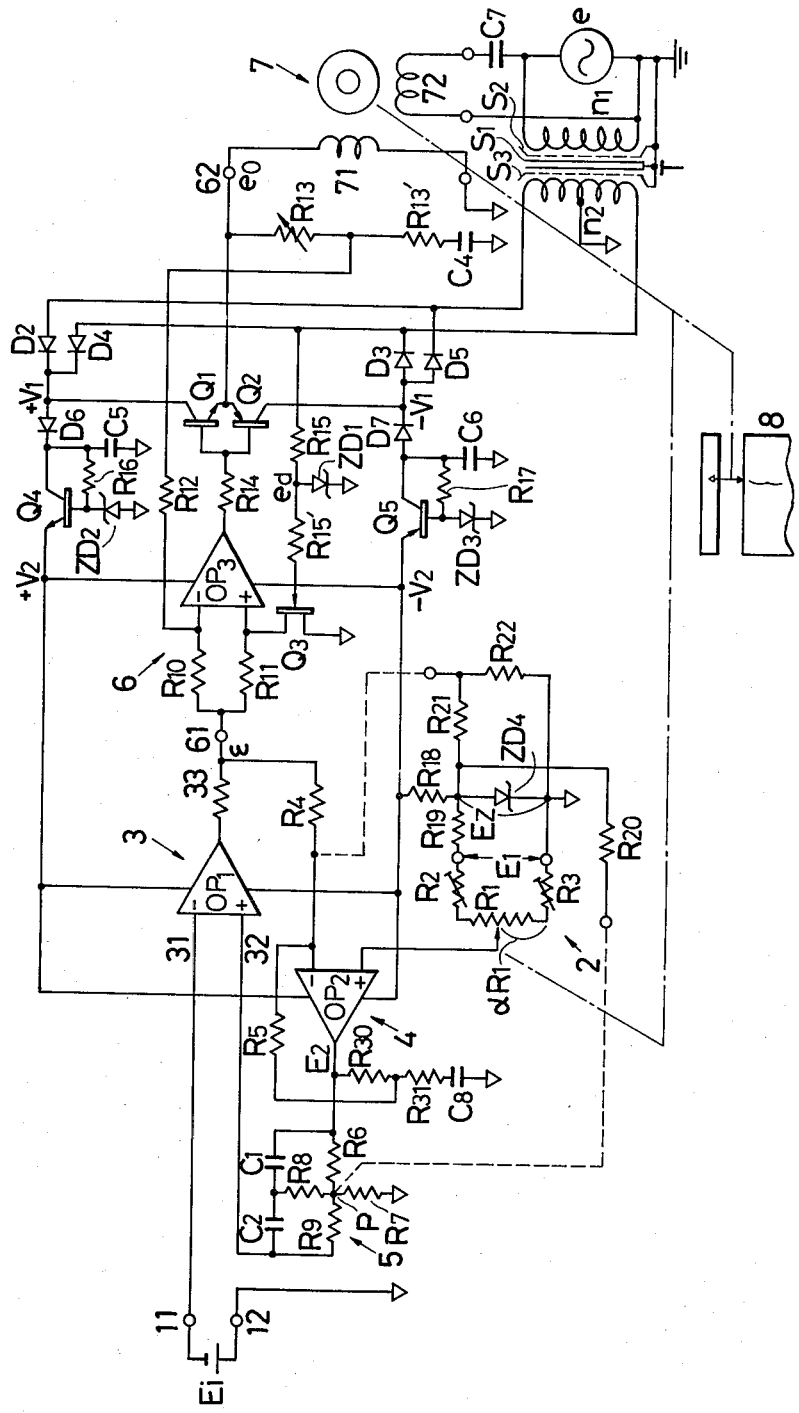
FIG. 3 is an electric circuit diagram of the servo-system of FIG. 1 modified for further attenuation.

A further greater noise attenuation ratio and improved damping characteristics can be attained by connecting, as shown in FIG. 3, the output of linear IC OP2 to the reference point through resistors R30 and R31 and a capacitor C8, and applying feedback from the joint of resistors R30 and R31 to the inversion input terminal (−) of linear IC OP2 through a resistor R5, and enabling the adder 4 to function as an active filter while selecting its constant properly.

The dc deviation signal ε from the dc amplifier 3 becomes proportional to the difference between the dc input signal voltage Ei and the value obtained by dividing the comparison voltage Ef, as represented by the following equation:

$$\epsilon = (1 + \frac{R6}{R7}) \frac{R4}{R5} \left\{ Ei - \frac{R7}{R6 + R7} (1 + \frac{R5}{R4}) Ef \right\} \quad (2)$$

Consequently, range adjustment for enabling the 0-to-100 percent displacement of the slide resistor brush to correspond to the variation span of input signal voltage Ei can be achieved by adjusting the resistors R6 and R7 of filter circuit 5. Since the resistors R6 and R7 are incorporated to form a module together with other resistors of filter circuit 5, both damping-constant selection and range adjustment can be performed simultaneously by selecting a desired resistance module.

The gain of the loop including dc amplifier 3, adder 4 and filter circuit 5 is $$(1 + \frac{R6}{R7}) \frac{R4}{R5}$$

which changes in accordance with the voltage division ratio of filter circuit 5. The loop gain $\mu\beta$ of the servo-loop is represented by $$(1 + \frac{R4}{R5}) G,$$

where G denotes the gain until generation of the comparison voltage Ef through the servo-amplifier 6 and the ac servo-motor 7. As the resistor R4 and R5 remain unchanged in the range adjustment, the loop gain $\mu\beta$ of the servo-loop is maintained constant without adjusting the gain of the servo-amplifier 6 at the time of range adjustment. In other words, a fixed-gain type amplifier is usable for the servo-amplifier 6.

The dc deviation signal ε is fed to the servo-amplifier 6. As the noninversion input terminal (+) of linear IC OP3 is connected to the reference point with turn-on of field-effect transistor Q3, the output $e_0$ of servo-amplifier 6 becomes $$e_0 = -m \frac{R12}{R10} \epsilon \quad (3)$$

where m is the voltage division ratio of variable resistor R13; and R12 is much greater than R13. Thus the servo-amplifier comes to function as an inverted amplifier. Subsequently, when the field-effect transistor Q3 is turned off, the dc deviation signal ε is applied to the noninversion input terminal (+) of linear IC OP3, so that the output $e_0$ becomes $$e_0 = m\epsilon \quad (4)$$

Figure 2:
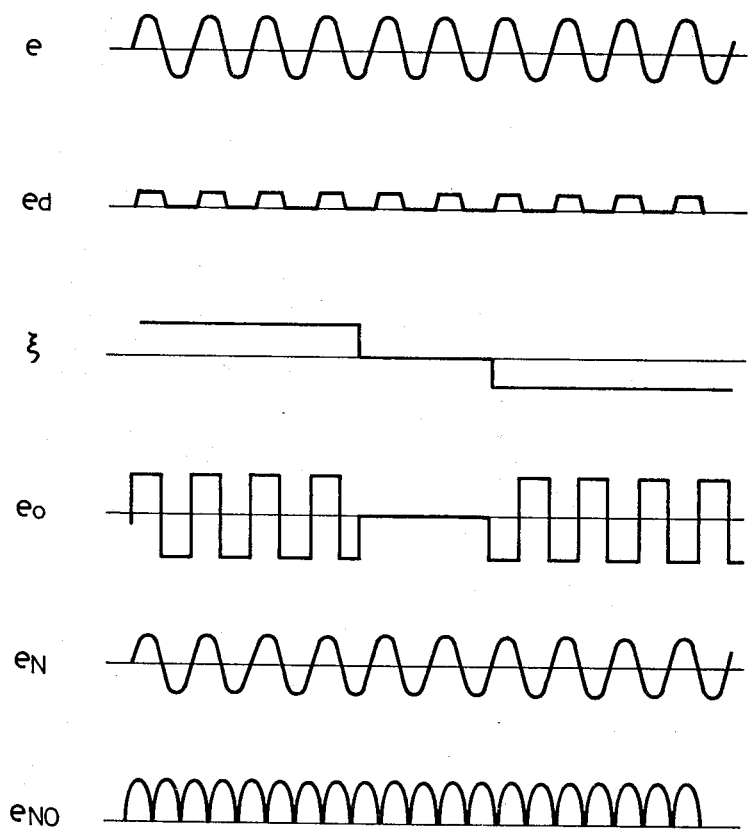
FIG. 2 is a waveform chart for explaining the operation of the servo-system of the invention.

Accordingly the servo-amplifier comes to function as a noninverted amplifier. If the resistance values of R10 and R12 are so selected as to be equal to each other, the output $e_0$ of servo-amplifier 6 is formed into a vertically symmetrical rectangular-wave signal in response to repeated turn-on and turn-off of field-effect transistor Q3, as shown in FIG. 2. The rectangular-wave signal has the same frequency as the ac power supply e, and its amplitude an phase respectively correspond to the magnitude and polarity of the dc deviation signal ε.

The rectangular-wave signal $e_0$ is applied to the control coil 71 of the ac servo-motor 7, which is thereby rotated in the forward or reverse direction in accordance with the amplitude and phase of the signal $e_0$ and displaces the brush of slide resistor R1 to zero-balance the dc deviation signal ε. Therefore, the displacement of the slide resistor brush becomes proportional to the dc input signal voltage Ei, as represented by $$\alpha = \frac{R2}{R1} \cdot \frac{R4}{R4 + R5} \cdot \frac{Ei}{Ef} - \frac{R3}{R1} \quad (5)$$

where R2, R19 is much greater than R1, R3. The displacement α is fed to an indicating/recording mechanism so that the dc input signal voltage Ei is indicated and recorded. As is clear from Equation (5), zero adjustment can be effected by the resistor R3 independently of span adjustment. The amount of transition of the zero point is determined by the ratio between resistors R3 and R1, and the requisite is merely the stability of the ratio, not the individual absolute stability of these resistors. Moreover, subtraction of the zero point can be executed by connecting the terminal voltage of zener diode ZD4 to the voltage division point P of filter circuit 5 through a resistor R20 as shown by a dotted line, while addition of the zero point can be executed by dividing the terminal voltage of zener diode by means of resistors R21, R22 and applying the divided voltage to the noninversion input terminal (−) of linear IC OP2; thus transition of the zero point can be achieved in the positive or negative direction. The span adjustment is performed by controlling the current flowing in the slide resistor R1 by means of resistor R2, and can be effected independently of the zero adjustment.

When ac noise $e_N$ of the supply voltage frequency is not eliminated by the filter 5 and is applied to the input terminal 61 of servo-amplifier 6 through the dc amplifier 3, such noise $e_N$ is converted by the on-off action of switch Q3 to ac noise $e_{NO}$ which has double the supply voltage frequency as shown in FIG. 2. The noise $e_{NO}$ appears at the output terminal 62, so that the ac servo-motor 7 remains unrotated, not being affected by the ac noise $e_N$.

In this manner, the servo-amplifier is capable of converting the output $\epsilon$ of dc amplifier 3 to an ac voltage of double the peak-to-peak amplitude through mere combination of linear IC OP3 and a single switch Q3. A coupling capacitor and so forth are not required; hence the number of component parts are minimized and phase shift caused by the capacitor is eliminated. Moreover, since a single switch Q3 is employed, a drive signal $e_d$ may be obtained by limiting only the amplitude of ac supply voltage e. It is also possible to attain damping characteristics by selecting different resistance values for R10, R12 and permitting the output $e_0$ to contain a dc component. Furthermore, the servo-amplifier 6 functions as a dc amplifier if the switch Q3 is set fixedly in either on-state or off-state, so that a dc motor is rendered usable as the servo-motor.

The phase-shifting capacitor C7 may be omitted by causing a 90° phase shift of the drive signal $e_d$ from the servo-motor exciting signal in order that the control signal for the servo-motor 7 (output signal $e_0$ of servo-amplifier 6) has a 90° phase difference from the exciting signal.

Figure 4:
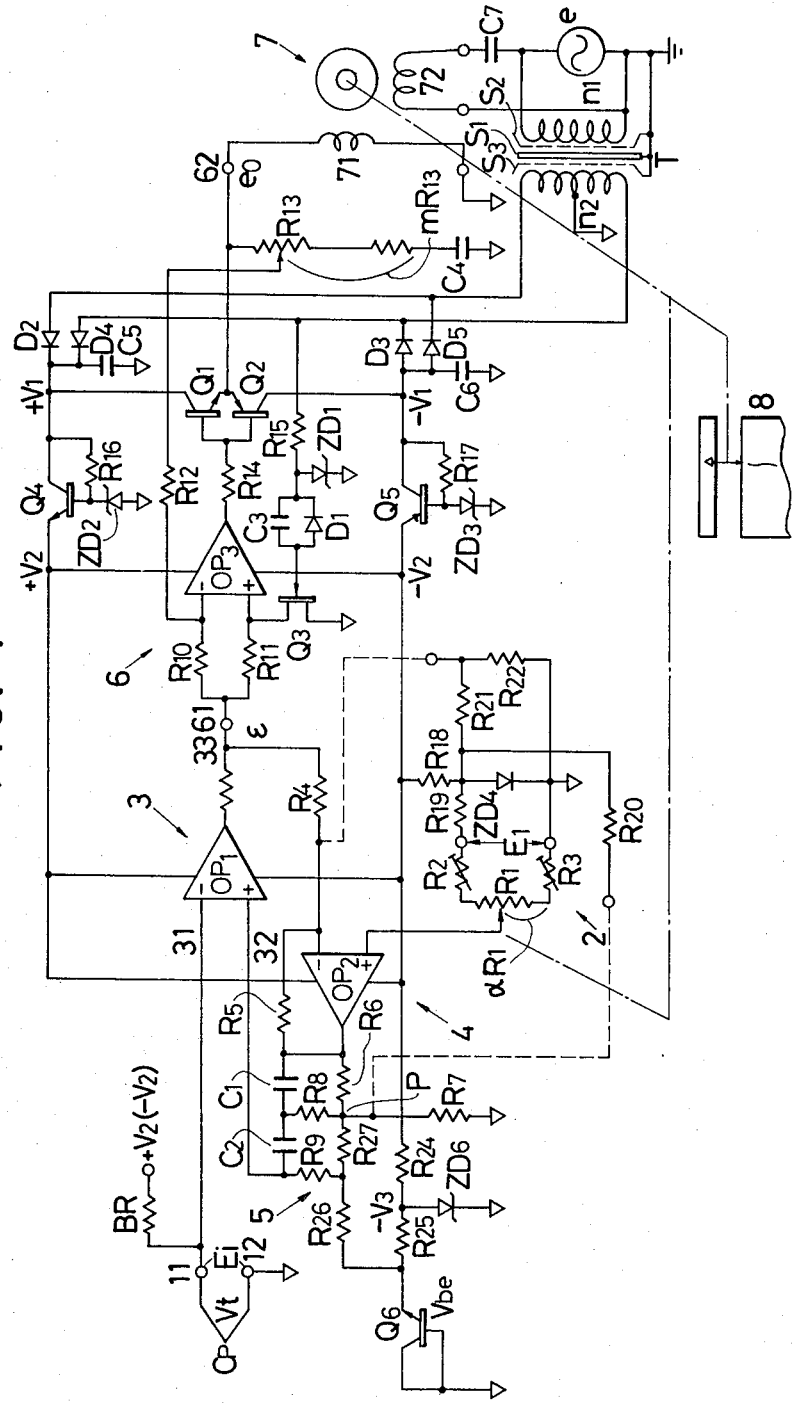
FIG. 4 is a circuit diagram of a servo-system embodying the invention and having a thermocouple as the input source.

FIG. 4 is a circuit diagram showing another embodiment of the servo-system of this invention. A thermocouple CP detects the temperature at the point to be measured, and its electromotive force Vt serves as an input signal voltage Ei is applied between the signal input terminals 11 and 12. A transistor Q6 functions to detect the cold-junction temperature in the thermocouple CP, and its base and collector are connected in common to a reference point while its emitter receives a negative dc voltage −V3 through a resistor R25 so that a fixed current determined by the dc voltage −V3 and the resistor R25 flows between the collector and emitter. The negative dc voltage −V3 serves to stabilize the negative dc voltage −V2 fed from a zener diode ZD6 through a resistor R24. When the fixed current flows between the collector and emitter of transistor Q6, its base-emitter voltage Vbe is substantially proportional to temperature in the vicinity of normal temperature. That is, the base-emitter voltage Vbe of transistor Q6 is of a value proportional to the cold-junction temperature in the thermocouple CP. The voltage Vbe is applied to the noninversion input terminal 32 of dc amplifier 3 through a resistor R9 after addition to the voltage at the voltage division point of filter circuit 5 by resistors R26 and R27. Accordingly, the dc deviation signal $\epsilon$ is represented by the following equation:

$$\epsilon = \frac{R4}{R5} \cdot \frac{R6 + R7}{R7} ( \frac{R26 + R27}{R26} Ei - \frac{R27}{R26} Vbe) - \frac{R4 + R5}{R5} Ef \quad (6)$$

where R6, R7 is much less than R27. If the resistance ratio R27/R26 is so set that R27/R26 Vbe becomes equivalent to the cold-junction temperature in the thermocouple CP at reference temperature (e.g. 20° C.), then R27/R26 Vbe becomes a cold-junction compensating voltage which varies linearly in proportion to the difference between the cold-junction temperature and the reference temperature. Consequently, the sum of the cold-junction compensating voltage and the electromotive force Vt of thermocouple CP in Equation (6) is proportional to the temperature at the detecting end. Since the temperature coefficient for a transistor Q6 can be maintained constant through adjustment of its collector current, the temperature coefficient for the cold-junction compensating voltage is determined by the accuracy of resistors R26 and R27, of which the resistance ratio is remarkably stable as they are incorporated to form a module. It is easy, therefore, to attain correspondence to any kind of thermocouple by selecting the value of resistor R26 properly.

The output of dc amplifier 3 is applied through a servo-amplifier 6 to an ac servo-motor 7, which then displaces the brush of a slide resistor R1 to reduce the output $\epsilon$ to zero, so that the displacement $\alpha$ becomes proportional to the temperature at the detecting end. This displacement $\alpha$ is fed to an indicating/recording mechanism 8, and thus the detecting-end temperature is indicated and recorded.

For the purpose of effecting burn-out action when a wire breakdown trouble occurs in the thermocouple CP, a burn-out resistor BR is connected to the input terminal 11, and a positive dc voltage +V2 or a negative dc voltage −V2 is applied thereto to keep the output of dc amplifier 3 at a predetermined value. The burn-out time depends on the time constant of burn-out resistor BR and the filter capacitor. Since the capacitance of the filter capacitor is small in this instance, the burn-out current can be reduced to minimize burn-out error.

Although in the foregoing example a transistor is used as the element for detecting the cold-junction temperature, some other detecting element may also be used. However, in the circuit where a transistor is employed, there exist advantages including that, due to its small size and uniform characteristics with little variation in temperature coefficient, interchangeability is attained through one-point temperature calibration at a reference temperature To, and also that high-accuracy compensation is attainable with minimum error as viewed from circuit configuration since integration with a cold-junction terminal is possible while merely a small circuit current is required.

Figure 5:
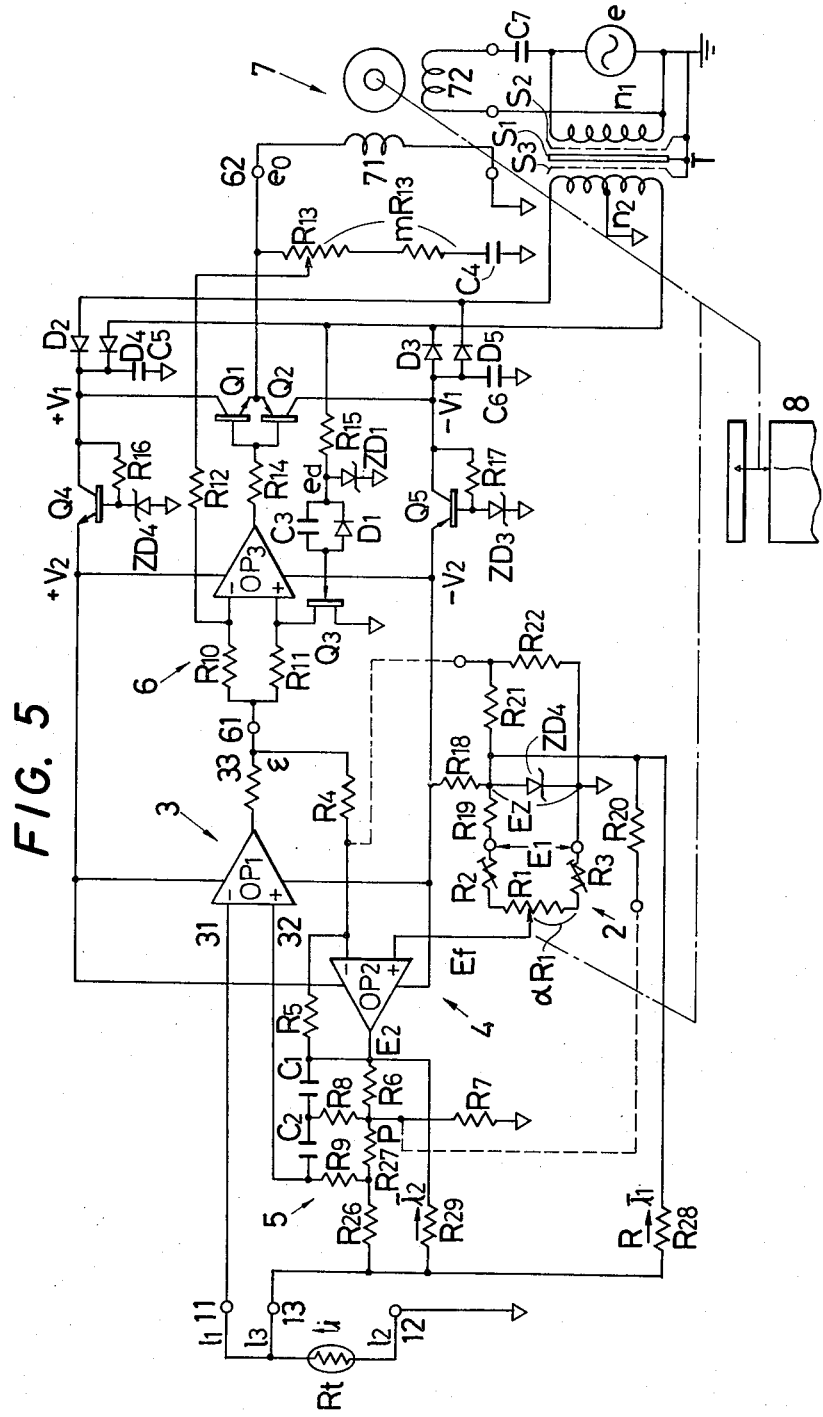
FIG. 5 is a circuit diagram of a servo-system embodying the invention and having a resistance bulb as the input source.

FIG. 5 is a circuit diagram showing another embodiment of the servo-system of the present invention. A three-wire platinum resistance bulb Rt is provided for detecting the temperature at a detecting end, and its leadwires 11, 12, 13 are connected to signal input terminals 11, 12, 13 respectively. A current i, which is the sum of a fixed current i1 determined by the zener voltage of a zener diode ZD4 and a resistor R28 and a current i2 proportional to the comparison voltage determined by a resistor R29 and the output E2 of a linear IC OP2 constituting an adder 4, flows in the resistance bulb Rt through a signal terminal 13. This terminal 13 is connected to the voltage division point P of a filter circuit 5 through resistors R26 and R27, which are connected to the noninversion input terminal 32 of a dc amplifier 3 through a resistor R9.

In the thermometer of this invention having the above structure, the current i flowing in the resistance bulb Rt does not flow into the input terminal of dc amplifier 3 due to its high input impedance; and the resistance values r of leadwires 11, 12, 13 of resistance bulb Rt are substantially equal to one another. The dc deviation signal $\epsilon$ is represented by the following equation:

$$\epsilon = \frac{R4}{R5} \cdot \frac{R6 + R7}{R7} \left\{ Rt\,i + \left(1 - \frac{R27}{R26}\right) ri \right\} - \frac{R4 + R5}{R5} Ef \quad (7)$$

If the resistance values of R26 and R27 are so selected as to be equal to each other, the influence of the leadwire resistance r is of no effect regardless of the value of current i flowing in the resistance bulb Rt.

A current i, which is the sum of a fixed current i1 and a current i2 (equal to E2/R29) proportional to the comparison voltage Ef, flows in the resistance bulb Rt. Therefore, the relationship between the comparison voltage Ef and the resistance bulb Rt is expressed as $$Ef = \frac{R4}{R4 + R5} \cdot \frac{R6 + R7}{R7} \cdot \frac{Rt}{1 - \frac{R6 + R7}{R7} \frac{Rt}{R29}} i1 \quad (8)$$

As is clear from Equation (8), the increase-rate of comparison voltage Ef rises as the resistance value of Rt becomes higher, and Ef increases linearly with respect to temperature. Accordingly, a resistor having linear slide, that is in which the resistance value changes linearly with respect to its displacement, is usable for the slide resistor R1 of the potentiometer 2 for generating the comparison voltage Ef. And the displacement $\alpha$ of slide resistor R1 is fed to an indicating/recording mechanism 8 to indicate and record the detecting-end temperature. Besides that, linearization is accomplished by the use of a voltage proportional to the comparison voltage Ef, thereby avoiding influence of the leadwire resistance r and acquiring only the net change of resistance bulb Rt to result in elimination of a span error. Furthermore, since the voltage for causing a flow of fixed current i1 in the resistance bulb Rt is obtained from the zener diode ZD4, there occurs no measurement error regardless of a variation in the reference voltage E1 of potentiometer 3. In addition, because the resistor R29 is incorporated to form a module with other resistors R6, R7 and so forth for range adjustment, it is an easy matter to obtain correspondence to the kind of resistance bulb Rt and the measuring range by selecting a desired resistance module.

Figure 6:
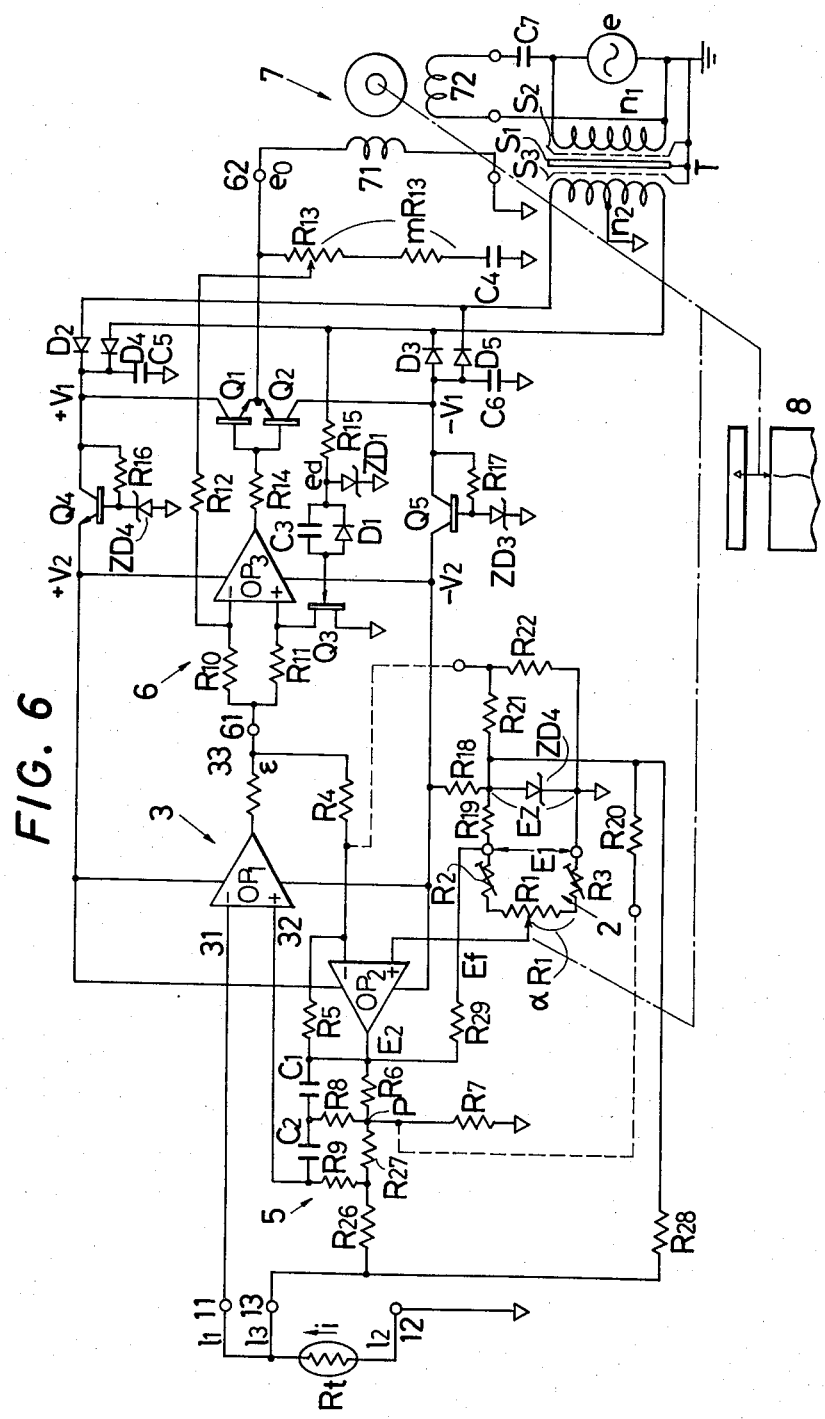
FIG. 6 is a circuit diagram of another servo-system embodying the invention and having another resistance bulb as the input source.

The above description relates to an example where the resistance bulb Rt employed is a platinum one whose resistance increase rate lowers with temperature. In the case of using a nickel or other resistance bulb whose resistance increase-rate rises with temperature, the circuit configuration may be such as illustrated in FIG. 6. In that circuit the output terminal of an adder 4 is connected through a resistor R29 to the node between resistors R19 and R2, and the output E2 of adder 4 is superposed on a fixed voltage $-Ez$ by resistors R19, R29 and then is applied to a potentiometer 2. In fact, linearization conforming to the characteristics of resistance bulb Rt can be easily achieved by selectively applying the output E2 of adder 4 either to the resistance bulb Rt through the resistor R29 or to the potentiometer 2.

According to the present invention, as described hereinabove, the output of a high-gain direct-coupled dc amplifier is added to a comparison voltage Ef and then is applied to the input side of the direct-coupled dc amplifier through a filter circuit in the manner to be differential to a dc input signal. Consequently, while the amplifier constituting the servo-system includes a great delay factor, it becomes possible, without impairing the stability of the servo-system, to eliminate harmful influence exerted when a filter of a large time constant is provided in the input circuit.

Moreover, a group of resistors to be adjusted in accordance with the kind of input signal (dc voltage input, thermocouple input or resistance bulb input) and its variation span are incorporated to form a single resistance module, so that range adjustment and so forth are achievable with facility by replacing the resistance module with a desired one.

We claim:

1. A servo-system responsive to a dc input signal comprising:
    a high-gain direct-coupled differential dc amplifier having said dc input signal as one input thereto,
    comparison signal generating means for generating a comparison signal,
    an adder for adding the output of said dc amplifier to said comparison signal,
    a filter circuit for filtering the output of said adder and for applying the filtered output as a second input to said dc amplifier,
    a servo-motor,
    a servo-amplifier connected between said dc amplifier and said servo-motor for driving said servo-motor in accordance with the differential output of said dc amplifier, and
    coupling means for coupling said comparison signal generating means to said servo-motor to vary said comparison signal in accordance with displacement of said servo-motor to zero-balance the output of said direct-coupled dc amplifier.

2. The servo-system as defined in claim 1, wherein said adder comprises a linear IC, and said comparison voltage is applied to the noninversion input terminal thereof while the output of the direct-coupled dc amplifier is applied to the inversion input terminal through a resistor, and the output of said linear IC is applied to the inversion input terminal through a resistor.

3. A servo-system as defined in claim 2, wherein the output terminal of the linear IC is connected to a reference point through a series circuit consisting of a voltage dividing resistor and a capacitor, and the voltage division point of said voltage dividing resistor is connected to the inversion input terminal of the linear IC through a resistor, whereby said adder performs as a filter.

4. The servo-system as defined in claim 1, wherein said filter circuit comprises a high-pass filter including two capacitors connected in series between the input and output thereof, two voltage dividing resistors for dividing the output voltage of the adder, a resistor for coupling the junction of said two resistors to the junction of said two capacitors, and a resistor for connecting the junction of said two voltage dividing resistors to the input of said dc amplifier.

5. The servo-system as defined in claim 4, wherein adjustment of said two voltage dividing resistors adjusts the range of said servo-system.

6. The servo-system as defined in claim 1, wherein said adder comprises a linear IC and a feedback resistor and said filter circuit comprises a group of resistors, said feedback resistor and said group of resistors being incorporated in a single circuit module.

7. The servo-system as defined in claim 1, further comprising an ac power supply for exciting said servo-motor, said servo-amplifier comprising:
a differential-input type direct-coupled amplifier having an inversion input terminal and a non-inversion input terminal to which the output of the dc amplifier is applied through respective resistors,
means for feeding the output of said direct-coupled amplifier to the inversion input terminal thereof through a resistor,
a switch connected between the noninversion input terminal and a reference point, and
means for turning said switch on and off synchronously with said exciting power supply.

8. The servo-system as defined in claim 7, wherein said servo-amplifier comprises a differential-input type direct-coupled amplifier including a differential-input type linear IC and two complementary transistors coupled to the output thereof, and said switch comprises a field-effect transistor with the drain and source connected between the noninversion input terminal of said linear IC and the reference point.

9. The servo-system as defined in claim 1, wherein said input signal is obtained from the electro-motive force of a thermocouple, said servo-system further comprising temperature detecting means for detecting the temperature at the cold junction of the thermocouple and for providing a temperature-representing voltage, and means for adding the temperature-representing voltage to the output of said filter circuit.

10. The servo-system as defined in claim 9, wherein said adding means includes a resistor and said filter circuit comprises a group of resistors, said adder resistor and said group of resistors being incorporated in a single circuit module.

11. The servo-system as defined in claim 9, wherein a transistor is used as said temperature detecting means.

12. The servo-system as defined in claim 1, wherein said input signal is a voltage drop obtained from a three-wire resistance bulb with a current flow therethrough, said servo-system further comprising:
means for connecting one of two leadwires located at one end of the resistance bulb to the inversion input terminal of said dc amplifier and for connecting the other leadwire of said two leadwires to a current source;
means for connecting the leadwires located at the other end of the resistance bulb to a reference point; and
means for adding the voltage drop across said resistance bulb to the output of the filter circuit by a resistance circuit, thereby eliminating influence of the resistance bulb leadwire resistance.

13. The servo-system as defined in claim 12, wherein said filter circuit comprises a group of resistors said resistance circuit and said group of resistors being incorporated in a single circuit module.

14. The servo-system as defined in claim 12, wherein said current source provides a current flow which is the sum of a fixed current and a current proportional to the adder output, thereby compensating for a decreasing resistance increase-rate of the resistance bulb with temperature rise.

15. The servo-system as defined in claim 12, wherein the adder is applied to the comparison signal generating means, thereby compensating for an increasing resistance increase-rate of the resistance bulb with temperature rise.

* * * * *